(12) United States Patent
Yamato

(10) Patent No.: US 12,220,882 B2
(45) Date of Patent: Feb. 11, 2025

(54) SHAPING METHOD AND SHAPING DEVICE

(71) Applicant: MITSUBISHI HEAVY INDUSTRIES, LTD., Tokyo (JP)

(72) Inventor: Homare Yamato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/829,175

(22) Filed: May 31, 2022

(65) Prior Publication Data

US 2022/0410507 A1    Dec. 29, 2022

(30) Foreign Application Priority Data

Jun. 28, 2021   (JP) .................................. 2021-106803

(51) Int. Cl.
   *B29C 70/44*    (2006.01)
   *B29C 53/04*    (2006.01)
   (Continued)

(52) U.S. Cl.
   CPC .............. *B29C 70/44* (2013.01); *B29C 53/04* (2013.01); *B29C 53/82* (2013.01); *B29C 70/543* (2013.01); *B29L 2009/00* (2013.01)

(58) Field of Classification Search
   CPC ....... B29C 70/44; B29C 70/543; B29C 53/04; B29C 53/82; B29L 2009/00
   See application file for complete search history.

(56) References Cited

U.S. PATENT DOCUMENTS

| | | |
|---|---|---|
| 9,073,256 B2 | 7/2015 | De Mattia |
| 10,336,014 B2 | 7/2019 | Stawski |
| | (Continued) | |

FOREIGN PATENT DOCUMENTS

| | | |
|---|---|---|
| GB | 2438389 A | 11/2007 |
| JP | 2017128095 A | 7/2017 |
| | (Continued) | |

OTHER PUBLICATIONS

Extended European Search Report of European Application No. 22175760.2 mailed Nov. 25, 2022; 8pp.

(Continued)

*Primary Examiner* — Alison L Hindenlang
*Assistant Examiner* — Erica Hartsell Funk
(74) *Attorney, Agent, or Firm* — HAUPTMAN HAM, LLP

(57) ABSTRACT

Provided is a shaping method for shaping a laminated body of multi-layered sheet materials containing reinforcing fibers by using a shaping die. The shaping die has a curved portion formed in a convex shape over a predetermined direction. The shaping method includes: fixing, to the shaping die, a holding member configured to cover the laminated body over the predetermined direction to maintain a state where the laminated body is pressed against the curved portion; sealing the laminated body and the holding member to the shaping die by a sealing member to form a closed space; and depressurizing the closed space to thin the laminated body by sucking air of the closed space, and the fixing fixes the holding member to the shaping die such that the holding member does not come into contact with an end face on one side in the predetermined direction of the laminated body.

6 Claims, 12 Drawing Sheets

(51) Int. Cl.
*B29C 53/82* (2006.01)
*B29C 70/54* (2006.01)
*B29L 9/00* (2006.01)

(56) References Cited

U.S. PATENT DOCUMENTS

| | | |
|---|---|---|
| 10,688,697 B2 | 6/2020 | Sundquist et al. |
| 2005/0183818 A1 | 8/2005 | Zenkner et al. |
| 2018/0154594 A1* | 6/2018 | Moram .................. B29C 70/681 |
| 2018/0200967 A1* | 7/2018 | Sutter ................... B29C 70/543 |
| 2020/0269526 A1 | 8/2020 | Goodfellow-Jones |
| 2022/0143935 A1 | 5/2022 | Yui et al. |

FOREIGN PATENT DOCUMENTS

| | | | | |
|---|---|---|---|---|
| JP | 2020093416 A | * | 6/2020 | ............. B29C 70/54 |
| WO | 2020245990 A1 | | 6/2019 | |

OTHER PUBLICATIONS

Office Action for Japanese Application No. 2021-106803 mailed Oct. 18, 2022; 3pp.

* cited by examiner

SHAPING METHOD AND SHAPING DEVICE

CROSS-REFERENCE TO RELATED APPLICATIONS

This application is based on Japanese Patent Application No. 2021-106803 filed on Jun. 28, 2021, the contents of which are incorporated herein by reference in its entirety.

BACKGROUND

1. Technical Field

The present disclosure relates to a shaping method and a shaping device that shape a laminated body of multi-layered sheet materials containing reinforcing fibers.

2. Description of Related Art

Composite structure members of aircrafts have particular cross-sectional shapes and, as a manufacturing method thereof, a method of pressing a laminated body of multi-layered sheet materials containing reinforcing fibers against a shaping die to shape the laminated body into an intended shape is known (see, for example, U.S. Pat. No. 10,336,014 and U.S. patent Ser. No. 10/688,697).

U.S. patent Ser. No. 10/336,014 discloses that a laminated body is arranged in a shaping die, which is sealed by a vacuum back diaphragm, and the sealed region is depressurized to shape the laminated body along the shaping die. U.S. patent Ser. No. 10/688,697 discloses that a laminated body is arranged in a shaping die, and a pressure is applied by a bladder to shape the laminated body along the shaping die.

In the shaping methods disclosed in U.S. patent Ser. No. 10/336,014 and U.S. patent Ser. No. 10/688,697, however, an operation to bend a laminated body along a shaping die and an operation to apply a pressure to the laminated body to thin the laminated body are performed at the same time. Thus, sliding caused by the bending operation and sliding caused by the thinning operation occur at the same time between a plurality of sheets (layers) forming the laminated body. If the sum of the sliding caused by the bending operation and the sliding caused by the thinning operation then increases, sliding between the plurality of sheets (layers) will not suitably take place, and a wrinkle may occur in the laminated body.

BRIEF SUMMARY

The present disclosure has been made in view of such circumstances and intends to provide a shaping method and a shaping device that can suppress a failure of a wrinkle occurring in a laminated body when bending the laminated body along a shaping die and thinning the laminated body.

A shaping method according to an aspect of the present disclosure is a shaping method for shaping a laminated body of multi-layered sheet materials containing reinforcing fibers by using a shaping die, wherein the shaping die has a curved portion formed in a convex shape over a predetermined direction, the shaping method comprising: a fixing step of fixing, to the shaping die, a holding member configured to cover the laminated body over the predetermined direction so as to maintain a state where the laminated body is pressed against the curved portion; a sealing step of sealing the laminated body and the holding member to the shaping die by a sealing member to form an enclosed space; and a depressurizing step of depressurizing the enclosed space to thin the laminated body by sucking air of the enclosed space formed in the sealing step, wherein the fixing step fixes the holding member to the shaping die such that the holding member does not come into contact with an end face on one side in the predetermined direction of the laminated body.

A shaping device according to an aspect of the present disclosure is a shaping device configured to shape a laminated body of multi-layered sheet materials containing reinforcing fiber, the shaping device comprising: a shaping die having a curved portion formed in a convex shape over a predetermined direction; a holding member configured to cover the laminated body over the predetermined direction so as to maintain a state where the laminated body is pressed against the curved portion; a sealing member configured to seal the laminated body and the holding member to the shaping die to form an enclosed space; and a depressurizing unit configured to depressurize the enclosed space to thin the laminated body by sucking air of the enclosed space, wherein in a state before the enclosed space is depressurized by the depressurizing unit, the holding member is fixed to the shaping die so as not to come into contact with an end face on one side in the predetermined direction of the laminated body.

According to the present disclosure, it is possible to provide a shaping method and a shaping device that can suppress a failure of a wrinkle occurring in a laminated body when bending the laminated body along a shaping die and thinning the laminated body.

DETAILED DESCRIPTION

Figure 1:
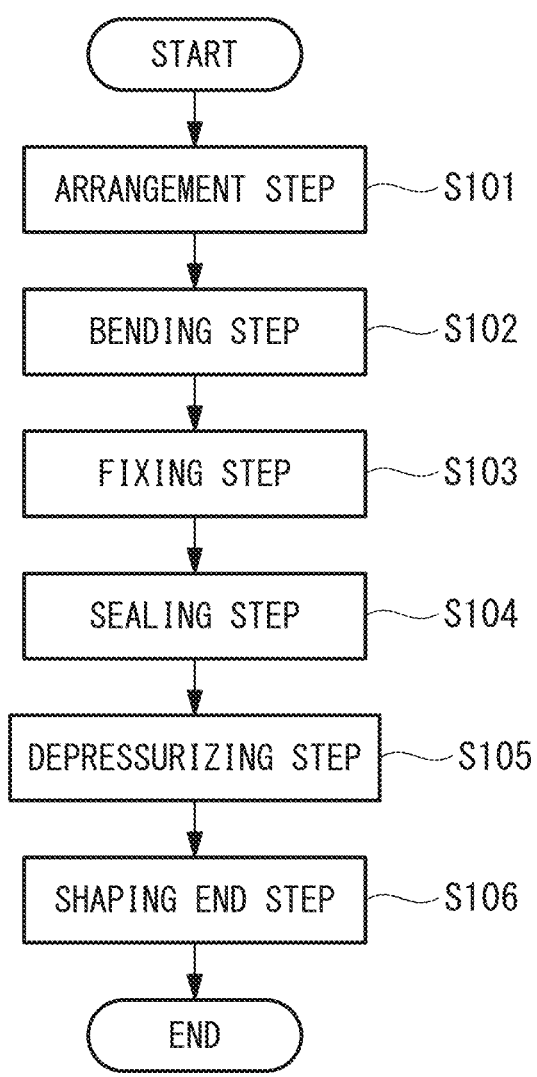
FIG. 1 is a flowchart illustrating a shaping method according to one embodiment of the present disclosure.

A shaping device 100 according to one embodiment of the present disclosure and a shaping method using the same will be described below with reference to the drawings. The shaping device 100 of the present embodiment is a device that shapes a laminated body 200 along the surface shape of a shaping die 10 that is to shape the laminated body 200 in which sheet materials containing reinforcing fibers are layered. The laminated body 200 is a component in which multiple layers of sheet-like composite materials are planarly laminated. The composite material forming the laminated body 200 is a sheet-like intermediate molded material in which a matrix resin is attached to reinforcing fibers in a semi-integrated manner.

The reinforcing fiber contained in the composite material may be, for example, carbon fiber, glass fiber, aramid fiber, or the like. As the matrix resin contained in the composite material, a thermosetting resin or a thermoplastic resin may be used. The thermosetting matrix resin may be, for example, an epoxy resin, unsaturated polyester, vinylester, phenol, cyanate ester, polyimide, or the like.

The thermoplastic matrix resin may be, for example, polyether ether ketone (PEEK), polyethylene terephthalate (PET), polybutylene terephthalate (PBT), nylon 6 (PA6), nylon 66 (PA66), polyphenylene sulfide (PPS), polyetherimide (PEI), polyether ketone ketone (PEKK), or the like.

When a thermoplastic resin is used as a matrix resin, the shaping die 10 includes a heating mechanism (not illustrated) that can heat the thermoplastic resin above the softening temperature thereof. By heating a thermoplastic resin above the softening temperature thereof by the heating mechanism, it is possible to shape the laminated body 200 containing the thermoplastic resin along the surface shape of the shaping die 10.

As the laminated body 200, a planarly shaped component of multi-layered sheet-like reinforcing fibers containing no matrix resin (dry sheets) may be used. When a plurality of sheet-like reinforcing fibers containing no matrix resin are used, a resin transfer molding (RTM) method is used, which arranges the laminated body 200 shaped along the surface shape of the shaping die 10 in a mold (not illustrated) and injects a resin material in the mold to immerse the resin material into reinforcing fibers for molding.

As illustrated in FIG. 2 to FIG. 6, the shaping device 100 of the present embodiment includes the shaping die 10, a holding member 20, a sealing member 30, a depressurizing unit 40, and a shaping tool 50. The shaping device 100 illustrated in FIG. 2 to FIG. 6 is arranged in a three-dimensional space. The X-axis, the Y-axis, and the Z-axis illustrated in FIG. 2 to FIG. 6 are axes intersecting each other in the three-dimensional space. The X-axis is an axis extending along an installation surface S on which the shaping die 10 is installed, and the Z-axis is an axis extending in a direction orthogonal to the installation surface S on which the shaping die 10 is installed. The Y-axis is an axis orthogonal to both the X-axis and the Z-axis, which is an axis extending in a depth direction of the drawing sheets of FIG. 2 to FIG. 6.

The shaping die 10 is a block-like die having a surface shape that shapes the laminated body 200 and is formed of a metal material, for example. The shaping die 10 has a first shaping surface 11, a second shaping surface 12, and a curved surface (curved portion) 13 as the surface shape that shapes the laminated body 200. Although the shaping die 10 of the present embodiment has the same cross-sectional shape at respective positions in the width direction WD along the Y-axis, other forms may be employed. For example, the shaping die 10 may have at least any one of a concave shape and a convex shape along the Y-axis.

The first shaping surface 11 of the shaping die 10 is a surface extending planarly along the X-axis. In the first shaping surface 11, a region including a first end 200a in the width direction WD of the laminated body 200 (first region) is arranged. The second shaping surface 12 of the shaping die 10 is a surface extending planarly along the Z-axis. In the second shaping surface 12, a region including a second end 200b in the width direction WD of the laminated body 200 (second region) is arranged.

The curved surface 13 is a surface connected between the first shaping surface 11 and the second shaping surface 12 and has an arc shape whose normal direction of the surface gradually changes so as to change itself from a surface along the X-axis to a surface along the Z-axis as the position approaches the second shaping surface 12 from the first shaping surface 11 along the X-axis. The curved surface 13 is formed in a convex shape from the X-axis direction (predetermined direction).

Although the shaping die 10 has an arc-shaped surface in which the first shaping surface 11 extends planarly along the X-axis, the second shaping surface 12 extends planarly along the Z-axis, and the curved surface 13 is connected between the first shaping surface 11 and the second shaping surface 12, other forms may be employed. For example, the first shaping surface 11 may be a surface extending in a direction different from the X-axis or may be a non-planar surface. Further, the second shaping surface 12 may be a surface extending in a direction different from the Z-axis or may be a non-planar surface. Further, the curved surface 13 may have any convex shape different from an arc shape.

Figure 2:
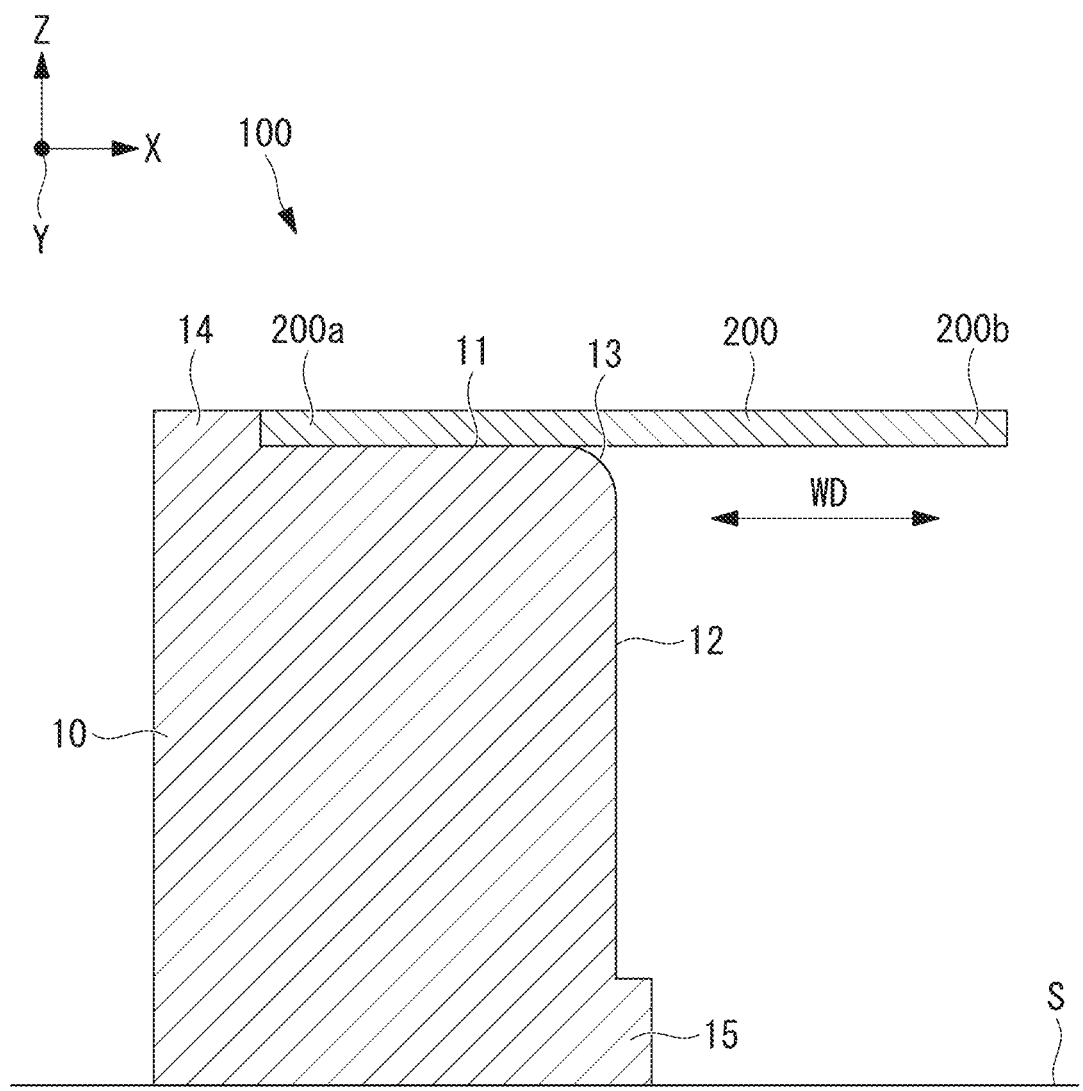
FIG. 2 is a sectional view illustrating a shaping device according to one embodiment of the present disclosure and illustrates a state where an arrangement step is completed.

As illustrated in FIG. 2, the shaping die 10 has a first protruding portion 14 and a second protruding portion 15. The first protruding portion 14 protrudes upward along the Z-axis from the first shaping surface 11 and is arranged facing the end face of the first end 200a of the laminated body 200. The second protruding portion 15 protrudes to the right along the X-axis from the second shaping surface 12 and is arranged facing the end face of the second end 200b of the laminated body 200 shaped on the shaping die 10.

Next, a shaping method performed by the shaping device 100 of the present embodiment will be described with reference to FIG. 1. FIG. 1 is a flowchart illustrating the shaping method according to the present embodiment.

In step S101 (arrangement step), a region including the first end 200a in the width direction WD of the laminated body 200 is arranged on the first shaping surface 11 of the shaping die 10. For example, the laminated body 200 is fixed to the shaping die 10 by clamping the first end 200a by a clamp (not illustrated) attached to the shaping die 10. Completion of step S101 results in a state illustrated in FIG. 2.

In step S102 (bending step), a region (second region) including the second end 200b in the width direction WD of the laminated body 200 in which the region including the first end 200a is arranged on the first shaping surface 11 by step S101 is pressed against the second shaping surface 12 to bend the laminated body 200 along the surface shape of the curved surface 13.

Figure 3:
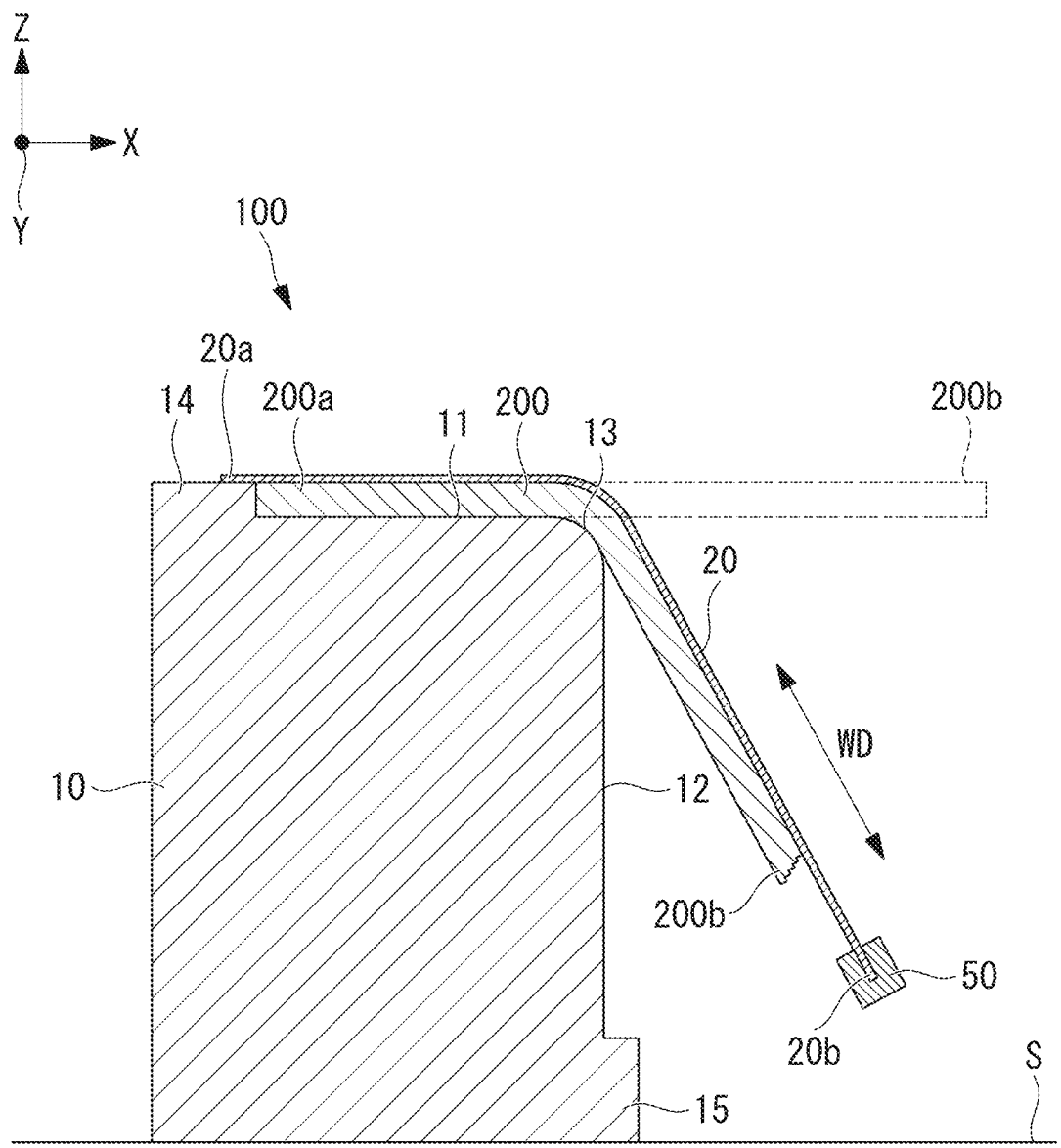
FIG. 3 is a sectional view illustrating the shaping device according to one embodiment of the present disclosure and illustrates a state where a bending step is being performed.

In step S102 (bending step), a first end 20a of the holding member 20 is fixed to the first protruding portion 14 of the shaping device 100 illustrated in FIG. 2. The holding member 20 is a member formed in a sheet-like manner or a tape-like manner and is fixed to the first protruding portion 14 by an adhesive agent, for example. As illustrated in FIG. 3, the holding member 20 is arranged so as to cover the entire part in the width direction WD of the laminated body 200.

To avoid direct contact of the holding member 20 with the laminated body 200, a sheet (not illustrated) having a die release property is arranged between the holding member 20 and the laminated body 200. Note that, instead of arrangement of a sheet having a die release property, a die release agent may be applied on the surface of the laminated body 200.

As illustrated in FIG. 3, the shaping tool 50 is attached to the second end 20b in the width direction WD of the holding member 20. By applying tension generated by a tension generator device (not illustrated) to the shaping tool 50, it is possible for the laminated body 200 to maintain a stretched state. The second end 200b of the laminated body 200 is moved to come into contact with the second shaping surface 12 while the stretched state of the laminated body 200 is maintained, and thereby the laminated body 200 is bent along the surface shape of the shaping die 10. Completion of step S102 results in a state illustrated in FIG. 4.

In step S103 (fixing step), the holding member 20 is fixed to the shaping die 10 so that the holding member 20 covers the laminated body 200 over the width direction WD so as to maintain the state where the laminated body 200 is pressed against the curved surface 13. Specifically, the second end 20b in the width direction WD of the holding member 20 is fixed to the second protruding portion 15 of the shaping die 10. The second end 20b of the holding member 20 is fixed to the second protruding portion 15 by an adhesive agent, for example.

Figure 4:
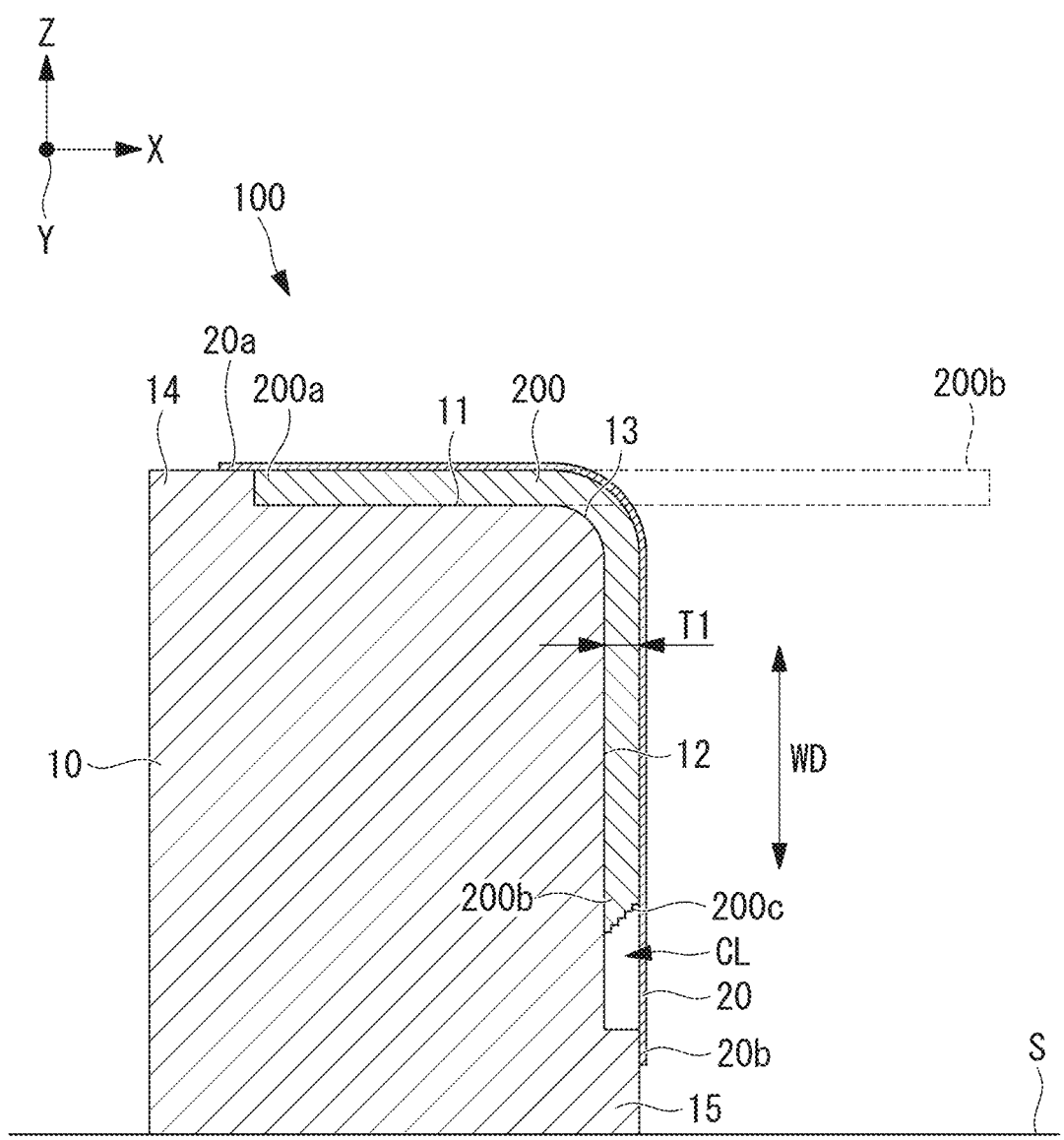
FIG. 4 is a sectional view illustrating the shaping device according to one embodiment of the present disclosure and illustrates a state where the bending step is completed.
Figure 5:
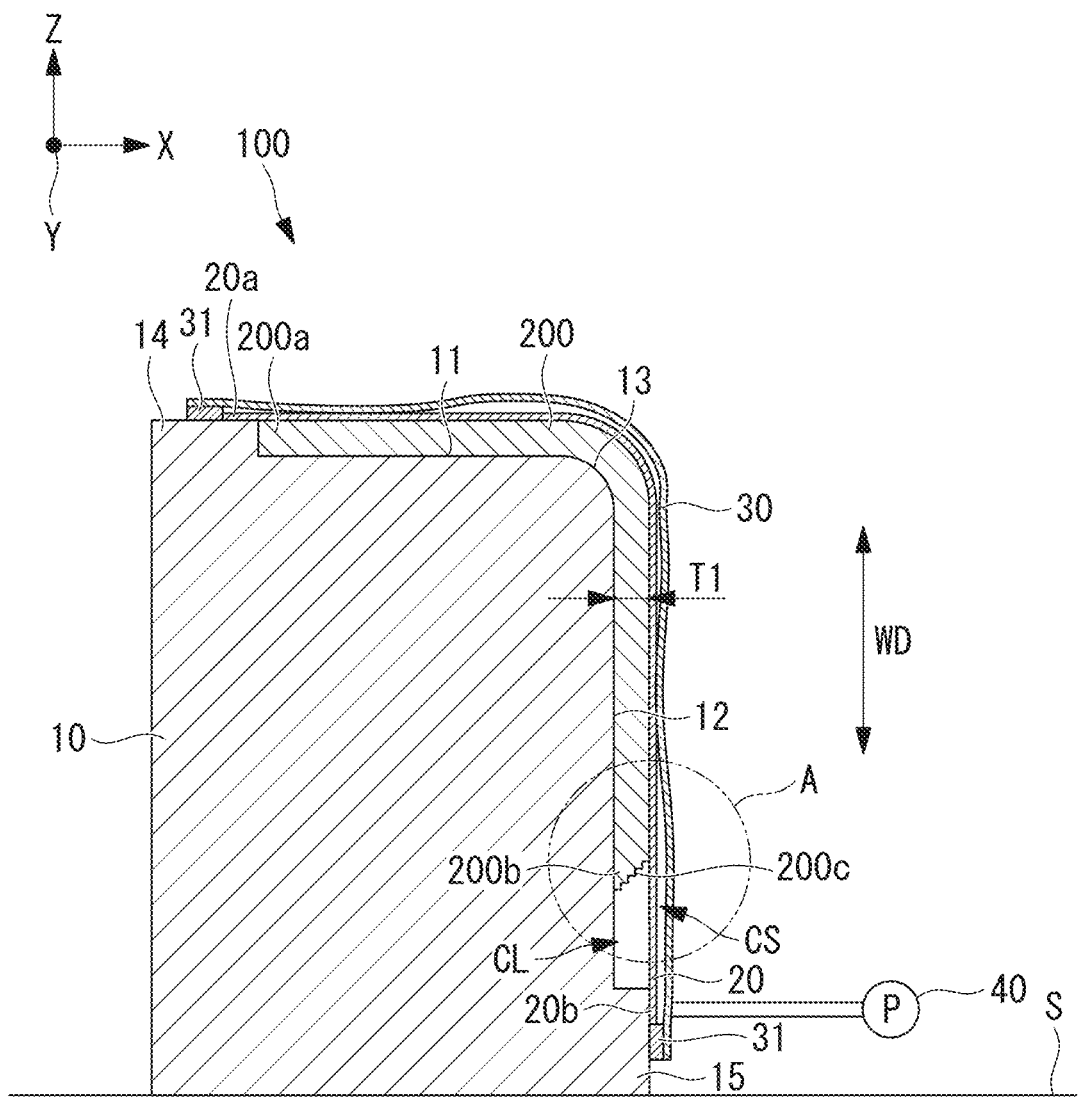
FIG. 5 is a sectional view illustrating the shaping device according to one embodiment of the present disclosure and illustrates a state where a sealing step is completed.
Figure 6:
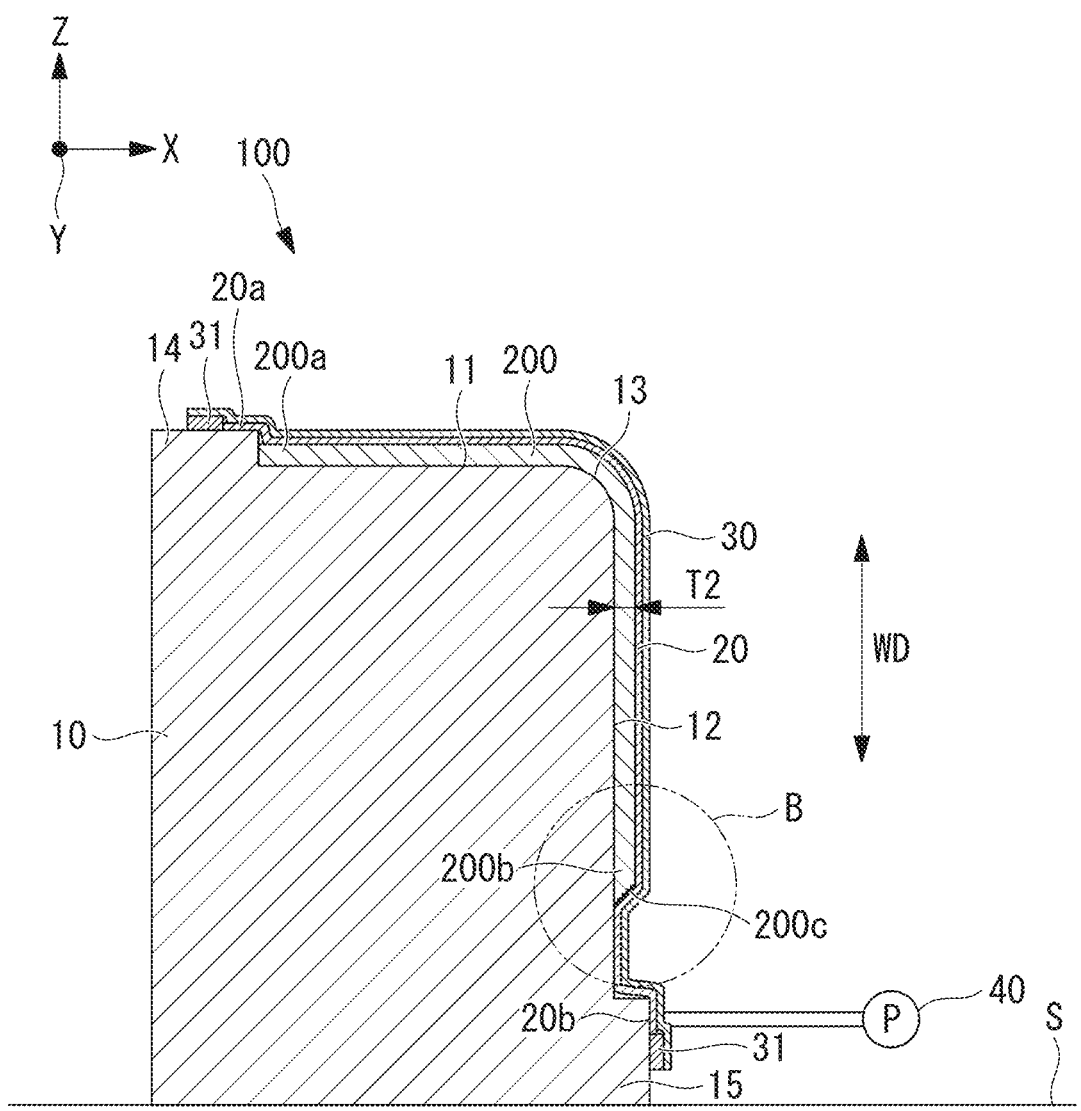
FIG. 6 is a sectional view illustrating the shaping device according to one embodiment of the present disclosure and illustrates a state where a depressurizing step is completed.

As illustrated in FIG. 4, the first end 20a of the holding member 20 is fixed to the first protruding portion 14, and the second end 20b of the holding member 20 is fixed to the second protruding portion 15. The holding member 20 interposes the laminated body 200 between the shaping die 10 and the holding member 20, and thereby a state where the laminated body 200 is pressed against the first shaping surface 11, the second shaping surface 12, and the curved surface 13 is maintained.

As illustrated in FIG. 4, step S103 is to fix the holding member 20 to the shaping die 10 so that the holding member 20 is not in contact with an end face 200c on one side in the width direction WD of the laminated body 200. Accordingly, a clearance CL is formed between the end face 200c in the width direction WD of the laminated body 200 and the second protruding portion 15 arranged facing the end face 200c in the width direction WD (direction along the Z-axis).

As illustrated in FIG. 4, the laminated body 200 has a thickness of T1 in which a plurality of sheet-like composite materials (sheet materials) are layered in the thickness direction. When the laminated body 200 is bent in step S102 (bending step), sliding occurs between the plurality of composite materials. This is because the circumferential length of a composite material arranged at a farther position from the curved surface 13 is longer than the circumferential length of a composite material arranged at a closer position to the curved surface 13.

Although the operation to bend the laminated body 200 is performed in step S102 (bending step), no operation to thin the laminated body 200 is performed. Thus, in step S102 (bending step), sliding between composite materials (interlayer sliding) due to thinning of the laminated body 200 does not occur, and only sliding between composite materials due to bending of the laminated body 200 occurs.

In step S104 (sealing step), the laminated body 200 and the holding member 20 are sealed by the sealing member 30 to form an enclosed space CS. The sealing member 30 is a member formed in a sheet-like manner and is formed of a resin material, for example. One end in the width direction WD of the sealing member 30 is joined to the first protruding portion 14 by an adhesive agent 31, and the other end in the width direction WD of the sealing member 30 is joined to the second protruding portion 15 by the adhesive agent 31.

In step S105 (depressurizing step), air of the enclosed space CS formed by step S104 (sealing step) is sucked to depressurize the enclosed space CS, and the laminated body 200 is pressurized by the atmospheric pressure to thin the laminated body 200. In step S105, the depressurizing unit 40, which is a pump, sucks air of the enclosed space CS to depressurize the enclosed space CS. Completion of step S105 results in a state illustrated in FIG. 6, and the thickness of the laminated body 200 is T2 that is thinner than T1.

In step S105, sliding occurs between the plurality of sheet-like composite materials when the laminated body 200 is thinned. This is because, when the laminated body 200 is thinned, the distance from the shaping surfaces (the first shaping surface 11, the second shaping surface 12, and the curved surface 13) of a plurality of composite materials is gradually reduced, and the circumferential length with respect to the curved surface 13 is reduced.

In step S105, while the operation to thin the laminated body 200 is performed, the operation to bend the laminated body 200 is not performed. Thus, in step S105, no sliding between composite materials due to bending of the laminated body 200 occurs, only sliding between composite materials due to thinning of the laminated body 200 occurs.

In step S106 (shaping end step), the sealing member 30 is detached from the shaping die 10, the holding member 20 is detached from the shaping die 10, and thereby the laminated body 200 shaped along the surface shape of the shaping die 10 is exposed. The laminated body 200 is then detached from the shaping die 10 and carried to a device where the next step takes place. Accordingly, the shaping method of FIG. 1 ends.

Figure 7:
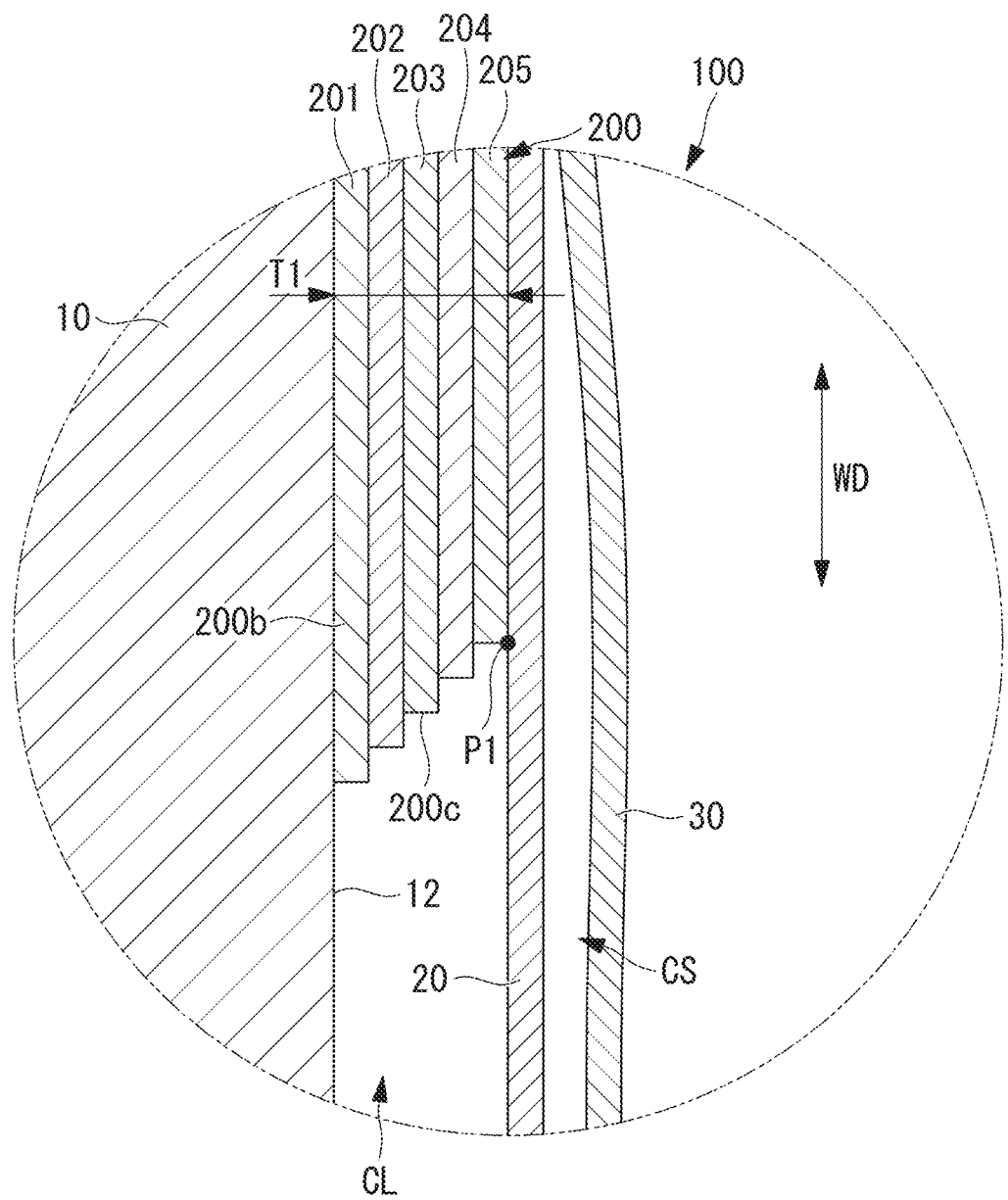
FIG. 7 is a partial enlarged view of a part A illustrated in FIG. 5.
Figure 8:
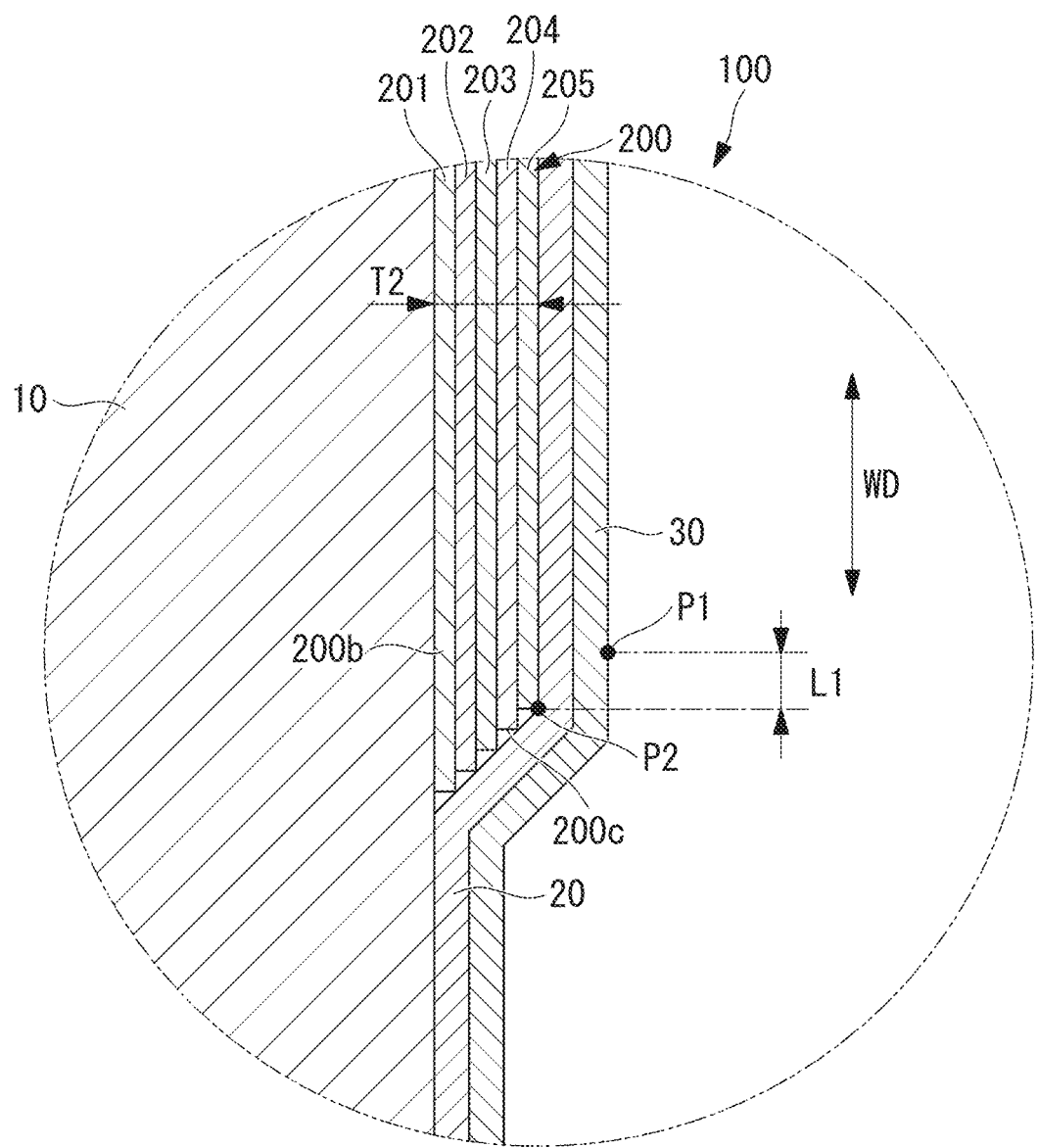
FIG. 8 is a partial enlarged view of a part B illustrated in FIG. 6.
Figure 9:
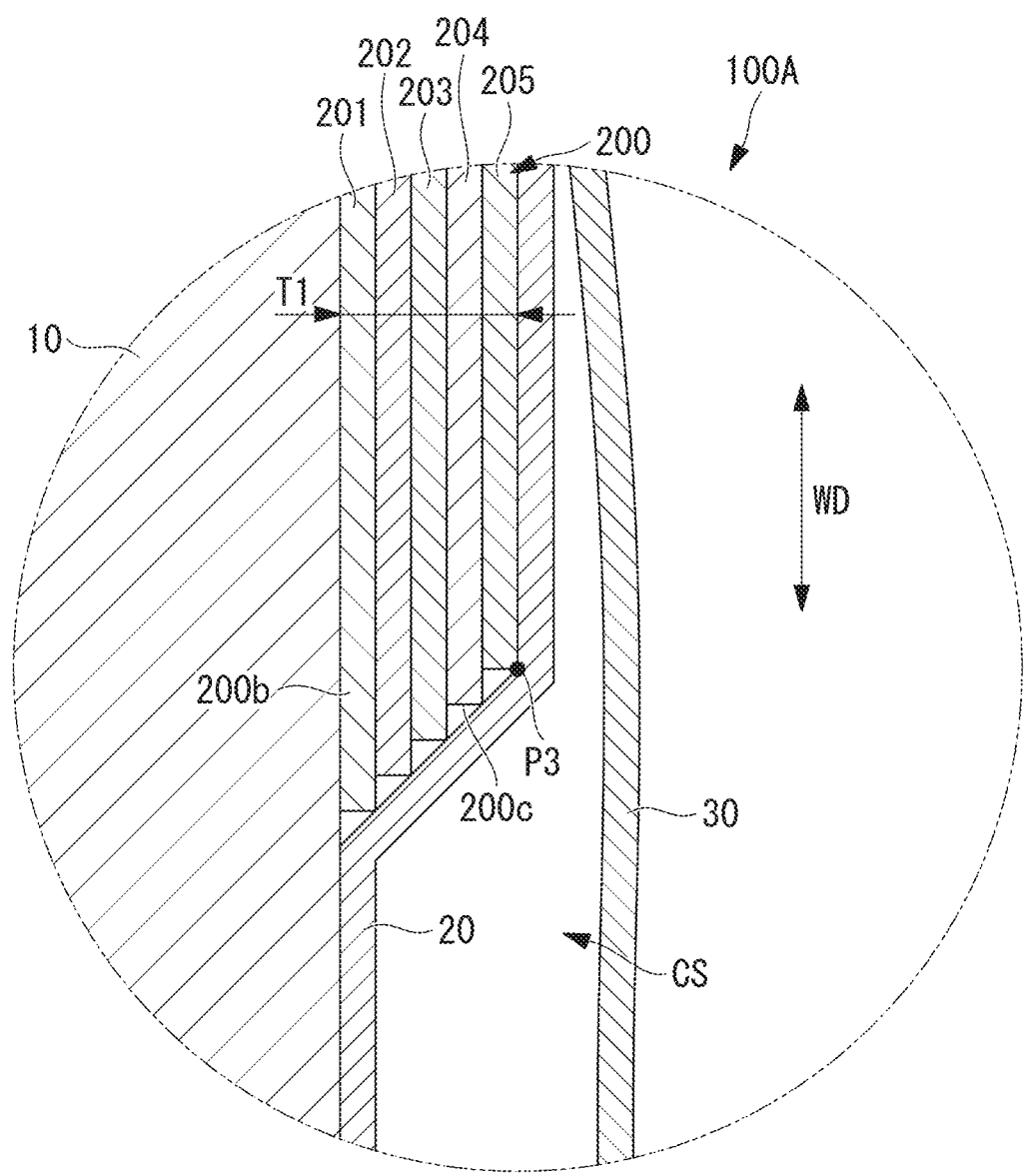
FIG. 9 is a diagram illustrating a comparative example to the present embodiment and illustrates a state where a sealing step is completed.
Figure 10:
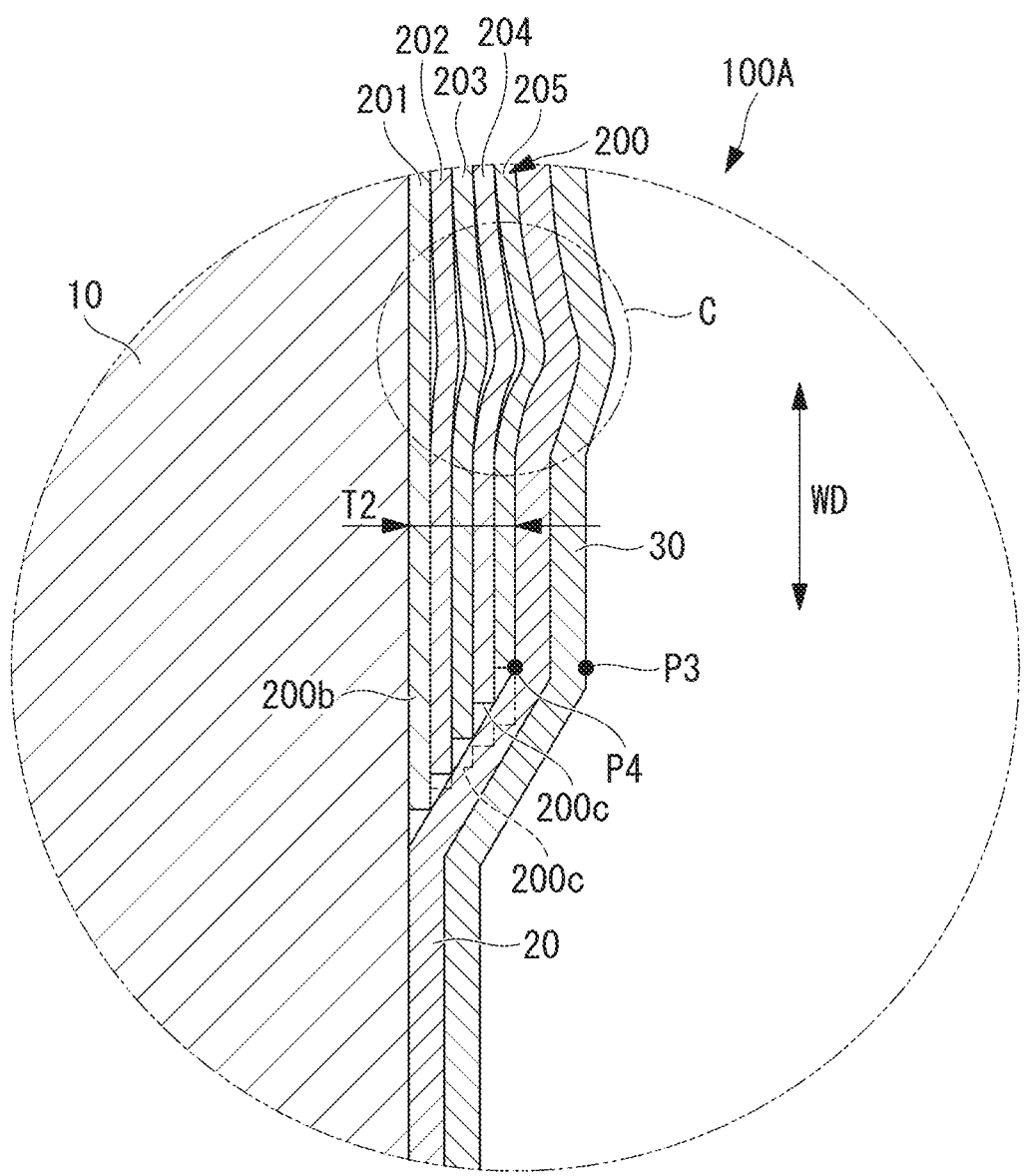
FIG. 10 is a diagram illustrating a comparative example to the present embodiment and illustrates a state where a depressurizing step is completed.

The reason why the holding member 20 is fixed to the shaping die 10 so as not to come into contact with the end face 200c in the width direction WD of the laminated body 200 in step S103 (fixing step) will now be described with reference to FIG. 7 to FIG. 10. FIG. 7 is a partial enlarged view of the part A illustrated in FIG. 5. FIG. 8 is a partial enlarged view of the part B illustrated in FIG. 6. FIG. 9 is a diagram illustrating a comparative example of the present embodiment and illustrates a state where the sealing step is completed. FIG. 10 is a diagram illustrating a comparative example of the present embodiment and illustrates a state where the depressurizing step is completed.

As illustrated in FIG. 7, the laminated body 200 of the present embodiment is formed of multi-layered sheet-like composite materials 201, 202, 203, 204, and 205. FIG. 7 illustrates a state after the sealing step illustrated in FIG. 1 is completed and before the depressurizing step is started. As illustrated in FIG. 7, the holding member 20 has been fixed to the shaping die 10 so as not to come into contact with the end face 200c of the second end 200b of the laminated body 200. The reason why the holding member 20 is fixed so as not to come into contact with the end face 200c is to prevent the holding member 20 from interfering with interlayer sliding between the composite materials 201, 202, 203, 204, and 205 in the depressurizing step.

Once the depressurizing step is started from the state illustrated in FIG. 7, air is sucked from the enclosed space CS, the enclosed space CS is depressurized, and in response, the sealing member 30 comes into contact with the holding member 20. In further depressurization, the holding member 20 is then pressed against the second shaping surface 12 so as to fill the clearance CL, and this results in a state illustrated in FIG. 8.

In the state illustrated in FIG. 8, the clearance CL is no longer present, and the holding member 20 is in contact with the end face 200c of the second end 200b of the laminated body 200. In the shaping device 100 of the present embodiment, the holding member 20 is not in contact with the end face 200c of the second end 200b of the laminated body 200 when the depressurizing step is started. Thus, interlayer sliding between the composite materials 201, 202, 203, 204, and 205 of the laminated body 200 is not interfered by the holding member 20 in the process of a reduction in the thickness of the laminated body 200 from T1 to T2 in the depressurizing step.

In FIG. 7, the position P1 indicates a position in the width direction WD of the end face 200c of the composite material 205 arranged outermost. In FIG. 8, the position P2 indicates a position in the width direction WD of the end face 200c of the composite material 205 arranged outermost. As illustrated in FIG. 8, the position in the width direction WD of the end face 200c of the composite material 205 moves by the length L1 from the position P1 to the position P2 in the depressurizing step.

FIG. 9 illustrates a shaping device 100A of a comparative example, which illustrates a state after the sealing step illustrated in FIG. 1 is completed and before the depressurizing step is started. As illustrated in FIG. 9, the holding member 20 is fixed to the shaping die 10 so as to come into contact with the end face 200c of the second end 200b of the laminated body 200.

Once the depressurizing step is started from the state illustrated in FIG. 9, air is sucked from the enclosed space CS, the enclosed space CS is depressurized, in response, the sealing member 30 comes into contact with the holding member 20, and this results in a state illustrated in FIG. 10. In the shaping device 100A of the comparative example, the holding member 20 is in contact with the end face 200c of the second end 200b of the laminated body 200 when the depressurizing step is started. Thus, interlayer sliding between the composite materials 201, 202, 203, 204, and 205 of the laminated body 200 is interfered by the holding member 20 in the process of a reduction in the thickness of the laminated body 200 from T1 to T2 in the depressurizing step.

In FIG. 9, the position P3 indicates a position in the width direction WD of the end face 200c of the composite material 205 arranged outermost. In FIG. 10, the position P4 indicates a position in the width direction WD of the end face 200c of the composite material 205 arranged outermost. As illustrated in FIG. 10, the position in the width direction WD of the end face 200c of the composite material 205 moves in the thickness direction of the laminated body 200 from the position P3 to the position P4 but does not move in the width direction WD in the depressurizing step.

This is because the holding member 20 is in contact with the end face 200c of the second end 200b of the laminated body 200 at the time of start of the depressurizing step, and interlayer sliding between the composite materials 201, 202, 203, 204, and 205 of the laminated body 200 is interfered by the holding member 20. The end face 200c illustrated by a dotted line in FIG. 10 represents the position of the end face 200c illustrated in FIG. 8.

In the shaping device 100A of the comparative example, interlayer sliding between the composite materials 201, 202, 203, 204, and 205 of the laminated body 200 is interfered by the holding member 20. Thus, suitable sliding does not occur between layers of the composite materials 201, 202, 203, 204, and 205 in a process of a reduction in the thickness of the laminated body 200 from T1 to T2. Thus, a wrinkle will occur in the part C of the laminated body 200.

Figure 11:
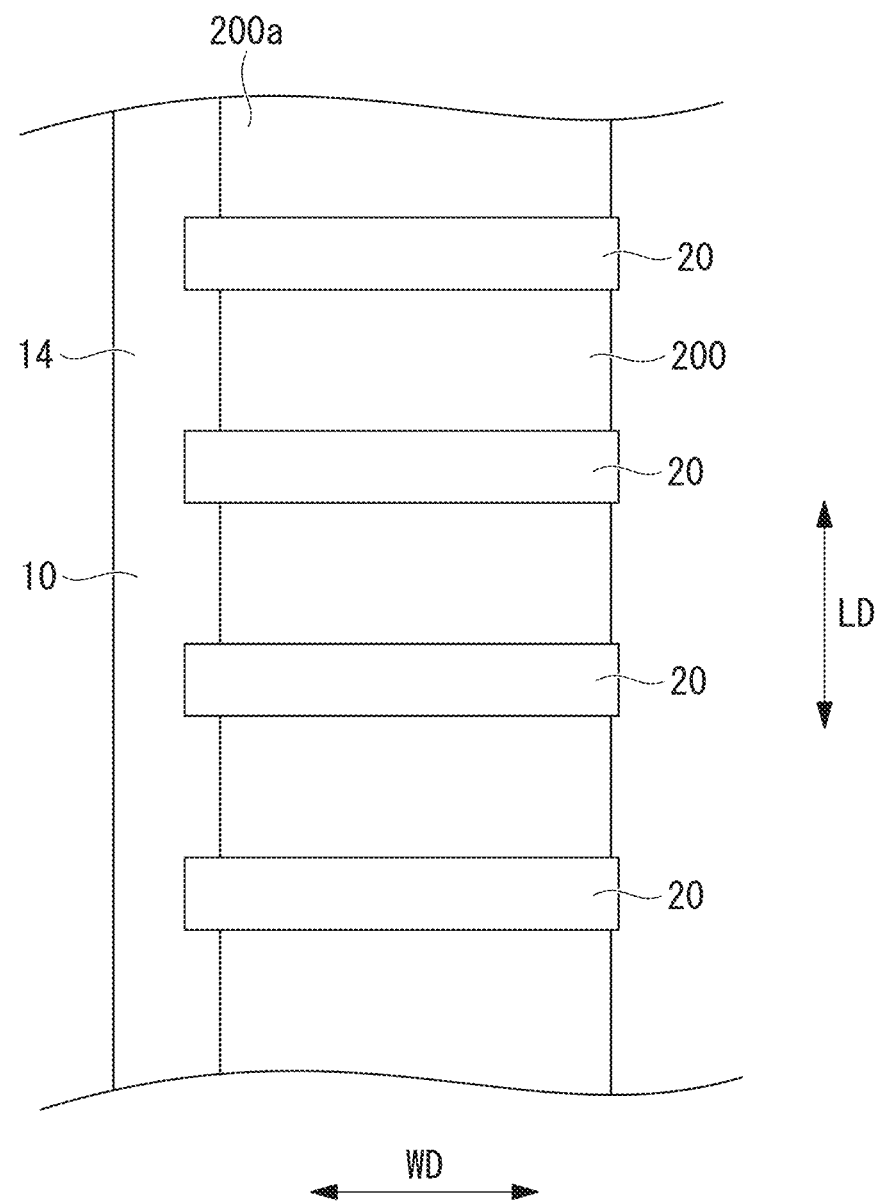
FIG. 11 is a plan view of the shaping device illustrated in FIG. 4 when viewed from above.

Next, the shape of the holding member 20 of the present embodiment will be described with reference to FIG. 11 and FIG. 12. FIG. 11 is a plan view of the shaping device 100 illustrated in FIG. 4 when viewed from above. As illustrated in FIG. 11, the holding members 20 are fixed to the shaping die 10 at a plurality of positions spaced apart from each other in the longitudinal direction LD orthogonal to the width direction WD. Step S103 (fixing step) of FIG. 1 is to perform an operation to fix the plurality of holding members 20 spaced apart from each other in the longitudinal direction LD to the shaping die 10.

Note that, when the shape of the shaping die 10 illustrated in FIG. 11 does not change in the longitudinal direction LD, the holding member 20 having a length equal to or longer than the laminated body 200 may be arranged entirely in the longitudinal direction LD instead of the holding members 20 being arranged at a plurality of positions spaced apart from each other in the longitudinal direction LD.

Figure 12:
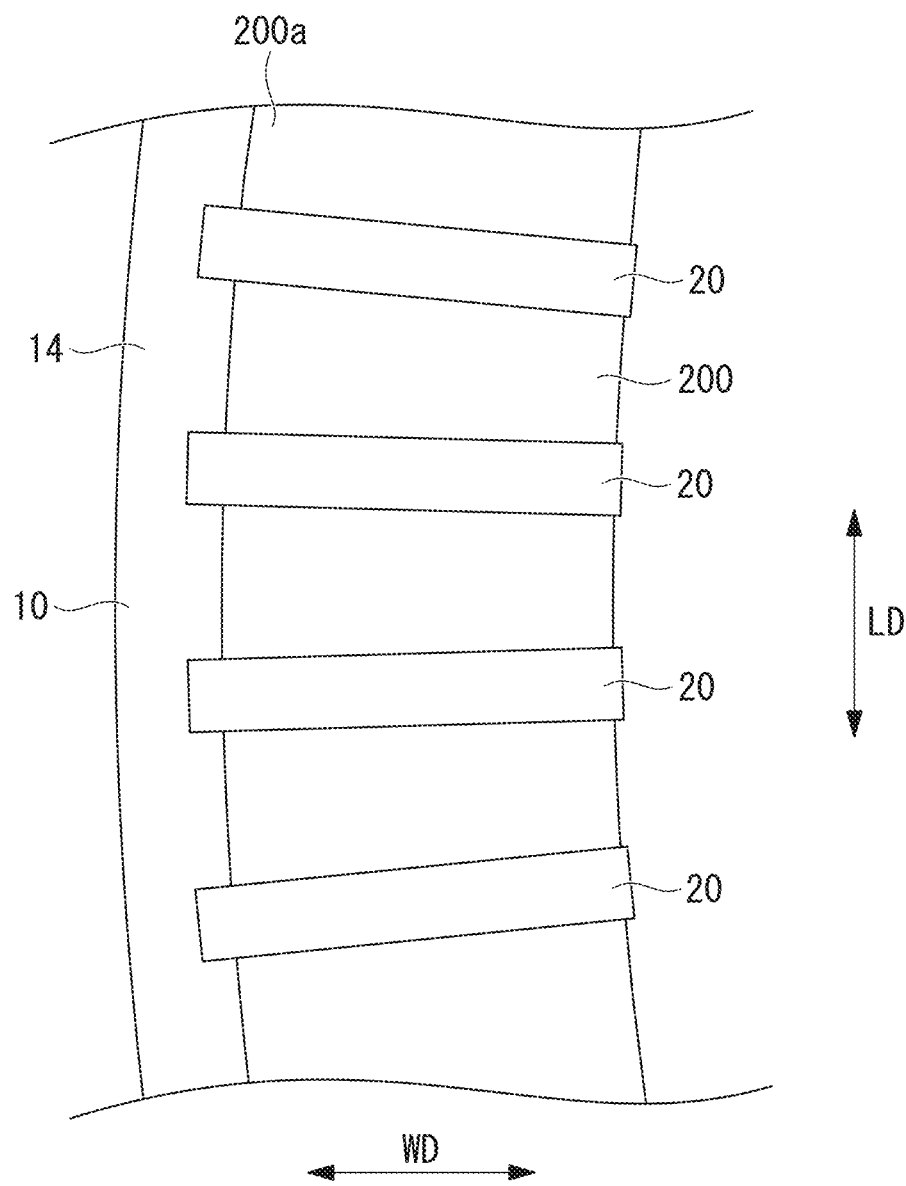
FIG. 12 is a plan view of a modified example of the shaping device when viewed from above.

FIG. 12 is a plan view of a modified example of a shaping device when viewed from above. The shaping die 10 illustrated in FIG. 12 is formed in an arc shape over the longitudinal direction LD. In the modified example illustrated in FIG. 12, the holding members 20 are fixed to the shaping die 10 at a plurality of positions spaced apart from each other in the longitudinal direction LD orthogonal to the width direction WD. Even when the shaping die 10 has a shape with a curvature in the longitudinal direction LD (contour shape), it is possible to fix the plurality of holding members 20, which are spaced apart from each other in the longitudinal direction LD, to the shaping die 10 without causing a wrinkle in the holding members 20.

Effects and advantages achieved by the shaping method of the present embodiment described above will be described.

According to the shaping method of the present embodiment, the holding member 20 is fixed to the shaping die 10 in the fixing step, a state where the laminated body 200 is pressed against the curved surface 13 formed in a convex shape over the width direction WD of the laminated body 200 is maintained. Further, the laminated body 200 and the holding member 20 are sealed by the sealing member 30 in the sealing step, and the enclosed space CS is formed. The enclosed space CS is depressurized in the depressurizing step, and the laminated body 200 is thinned. Since the operation to bend the laminated body 200 is not performed in the depressurizing step, sliding occurring between composite materials can be reduced compared to a case where an operation to bend the laminated body 200 is performed at the same time.

According to the shaping method of the present embodiment, the holding member 20 is fixed to the shaping die 10 so as not to come into contact with the end face 200c in the width direction WD of the laminated body 200. The reason why the holding member 20 is fixed so as not to come into contact with the end face 200c is to prevent interference with interlayer sliding between composite materials in the depressurizing step. According to the shaping method of the present embodiment, it is possible to suitably cause sliding between layers of the composite materials of the laminated body 200 when thinning the laminated body 200 in the depressurizing step and suppress a failure of a wrinkle occurring in the laminated body 200.

According to the shaping method of the present embodiment, the region including the first end 200a in the width direction WD of the laminated body 200 is arranged in the shaping die 10 in the arrangement step, and the second region in the width direction of the laminated body 200 is pressed against the shaping die and bent along the surface shape of the curved portion in the bending step. Since the operation to thin the laminated body is not performed in the bending step, sliding occurring between sheet materials can be reduced compared to a case where an operation to thin the laminated body is performed at the same time. It is therefore possible to suitably cause sliding between layers of the sheet materials of the laminated body when bending the laminated body along the surface shape of the curved portion in the bending step and suppress a failure of a wrinkle occurring in the laminated body.

According to the shaping method of the present embodiment, one end in the width direction WD of the holding member 20 is fixed to the first protruding portion 14 protruding from the first shaping surface 11 on which the region including the first end 200a of the laminated body 200 is arranged, and the other end in the width direction WD of the holding member 20 is fixed to the second protruding portion 15 protruding from the second shaping surface 12 on which the region including the second end 200b of the laminated body 200 is arranged. Accordingly, it is possible to fix the holding member 20 to the shaping die 10 so as not to come into contact with the end face 200c in the width direction WD of the region including the second end 200b of the laminated body 200 while maintaining the state where the laminated body 200 is pressed against the curved surface 13 of the shaping die 10.

According to the shaping method of the present embodiment, since the clearance CL is formed between the end face 200c in the width direction WD of the region including the second end 200b of the laminated body 200 and the second protruding portion 15, it is possible to reliably prevent the holding member 20 from coming into contact with the end face 200c in the width direction WD of the region including the second end 200b of the laminated body 200 and interfering with interlayer sliding between the composite materials.

The shaping method of the embodiment described above can be understood as follows, for example.

The shaping method of the present disclosure is a shaping method for shaping a laminated body (200) of multi-layered sheet materials containing reinforcing fibers by using a shaping die (10), and the shaping die has a curved portion formed in a convex shape over a predetermined direction (LD). The shaping method includes: a fixing step (S103) of fixing, to the shaping die, a holding member (20) configured to cover the laminated body over the predetermined direction so as to maintain a state where the laminated body is pressed against the curved portion; a sealing step (S104) of sealing the laminated body and the holding member to the shaping die by a sealing member (30) to form an enclosed space (CS); and a depressurizing step (S105) of depressurizing the enclosed space to thin the laminated body by sucking air of the enclosed space formed in the sealing step, and the fixing step fixes the holding member to the shaping die such that the holding member does not come into contact with an end face (200c) on one side in the predetermined direction of the laminated body.

According to the shaping method of the present disclosure, the holding member is fixed to the shaping die in the fixing step, a state where the laminated body is pressed against the curved portion formed in a convex shape over a predetermined direction is maintained. Further, the laminated body and the holding member are sealed by the sealing member in the sealing step, and the enclosed space is formed. The enclosed space is depressurized in the depressurizing step, and the laminated body is thinned. Since the operation to bend the laminated body is not performed in the depressurizing step, sliding occurring between sheet materials can be reduced compared to a case where an operation to bend the laminated body is performed at the same time.

Further according to the shaping method of the present disclosure, the holding member is fixed to the shaping die so as not to come into contact with the end face on one side in the width direction of the laminated body. The reason why the holding member is fixed so as not to come into contact with the end face is to prevent interference with interlayer sliding between the sheet materials in the depressurizing step. According to the shaping method of the present disclosure, it is possible to suitably cause sliding between layers of the sheet materials of the laminated body when thinning the laminated body in the depressurizing step and suppress a failure of a wrinkle occurring in the laminated body.

In a preferable configuration, the shaping method of the present disclosure may include an arrangement step (S101) of arranging a first region in the predetermined direction of the laminated body on the shaping die, and the fixing step may fix the holding member to the shaping die such that the holding member does not come into contact with an end face of a second region of the laminated body, the second region being different from the first region in the predetermined direction.

According to the shaping method of the present configuration, the first region in a predetermined direction of the laminated body is arranged in the shaping die in the arrangement step, and the holding member is fixed to the shaping die so as not to come into contact with the end face of the second region in the predetermined direction. Since the holding member does not come into contact with the end face of the second region, interlayer sliding between the sheet materials is not interfered by the holding member when the laminated body is thinned in the depressurizing step.

In one aspect of the shaping method of the present disclosure, the shaping method may include a bending step (S102) of bending the laminated body along a surface shape of the curved portion by pressing the second region in the predetermined direction of the laminated body against the shaping die, and the first region has been arranged on the shaping die in the arrangement step.

According to the shaping method of the present aspect, since the operation to thin the laminated body is not performed in the bending step, sliding occurring between sheet materials can be reduced compared to a case where an operation to thin the laminated body and an operation to bend the laminated body are performed at the same time. It is therefore possible to suitably cause sliding between layers of the sheet materials of the laminated body when bending the laminated body along the surface shape of the curved portion in the bending step and suppress a failure of a wrinkle occurring in the laminated body.

In a preferable form of the shaping method of the above aspect, the shaping die may have a first shaping surface (11) on which the first region of the laminated body is arranged, a first protruding portion (14) protruding from the first shaping surface and arranged facing an end face in the predetermined direction of the first region of the laminated body, a second shaping surface (12) on which the second region of the laminated body is arranged, and a second protruding portion (15) protruding from the second shaping surface and arranged facing an end face in the predetermined direction of the second region of the laminated body bent in the bending step, and the fixing step may fix one end in the predetermined direction of the holding member to the first protruding portion and fix the other end in the predetermined direction of the holding member to the second protruding portion.

According to the shaping method of the present form, one end in a predetermined direction of the holding member is fixed to the first protruding portion protruding from the first shaping surface on which the first region of the laminated body is arranged, and the other end in the predetermined direction of the holding member is fixed to the second protruding portion protruding from the second shaping surface on which the second region of the laminated body is arranged. Accordingly, it is possible to fix the holding member to the shaping die so as not to come into contact with the end face in the predetermined direction of the second region of the laminated body while maintaining the state where the laminated body is pressed against the curved portion of the shaping die.

In the shaping method of the above form, preferably, the fixing step may fix the holding member to the shaping die such that a clearance (CL) is formed between an end face in the predetermined direction of the second region of the laminated body and the second protruding portion.

According to the shaping method described above, since the clearance is formed between the end face in a predetermined direction of the second region of the laminated body and the second protruding portion, it is possible to reliably prevent the holding member from coming into contact with the end face in the predetermined direction of the second region of the laminated body and interfering with the interlayer sliding between the sheet materials.

In a preferable configuration of the shaping method of the present disclosure, the fixing step may fixes, to the shaping die, a plurality of holding members spaced apart from each other in a direction orthogonal to the predetermined direction.

According to the shaping method of the present configuration, even when the shaping die has a shape having a curvature in a direction orthogonal to the predetermined direction (contour shape), it is possible to fix a plurality of holding members, which are spaced apart from each other in the direction orthogonal to the predetermined direction, to the shaping die without causing a wrinkle in the holding member.

The shaping device of the embodiment described above can be understood as follows, for example.

The shaping device of the present disclosure is a device configured to shape a laminated body of multi-layered sheet materials containing reinforcing fibers. The shaping device includes: a shaping die having a curved portion formed in a convex shape over a predetermined direction; at least one holding member configured to cover the laminated body over the predetermined direction so as to maintain a state where the laminated body is pressed against the curved portion; a sealing member configured to seal the laminated body and the holding member to the shaping die to form an enclosed space; and a depressurizing unit configured to depressurize the enclosed space to thin the laminated body by sucking air of the enclosed space, and in a state before the enclosed space is depressurized by the depressurizing unit, the holding member is fixed to the shaping die so as not to come into contact with an end face on one side in the predetermined direction of the laminated body.

According to the shaping device of the present disclosure, a state where the laminated body is pressed against the curved portion formed in a convex shape over a predetermined direction is maintained by the holding member. Further, the laminated body and the holding member are sealed by the sealing member, and the enclosed space is formed. The enclosed space is depressurized by the depressurizing unit, and the laminated body is thinned. Since the operation to bend the laminated body is not performed when the laminated body is thinned by the depressurizing unit, sliding occurring between sheet materials can be reduced compared to a case where an operation to bend the laminated body is performed at the same time.

Further, according to the shaping device of the present disclosure, the holding member is fixed to the shaping die so as not to come into contact with the end face on one side in the predetermined direction of the laminated body in a state before the enclosed space is depressurized by the depressurizing unit. The reason why the holding member is fixed so as not to come into contact with the end face is to prevent interference with interlayer sliding between the sheet materials when depressurized by the depressurizing unit. According to the shaping device of the present disclosure, it is possible to suitably cause sliding between layers of the sheet materials of the laminated body when thinning the laminated body by the depressurizing unit and suppress a failure of a wrinkle occurring in the laminated body.

In a preferable configuration of the shaping device of the above configuration, the shaping die may have a first shaping surface on which a first region of the laminated body is arranged, a first protruding portion protruding from the first shaping surface and arranged facing an end face in the predetermined direction of the first region of the laminated body, a second shaping surface on which a second region of the laminated body is arranged, and a second protruding portion protruding from the second shaping surface and arranged facing an end face in the predetermined direction of the second region of the laminated body bent along the curved portion, and one end in the predetermined direction of the holding member may be fixed to the first protruding portion, and the other end in the predetermined direction of the holding member may be fixed to the second protruding portion.

According to the shaping device of the above configuration, one end in a predetermined direction of the holding member is fixed to the first protruding portion protruding from the first shaping surface on which the first region of the laminated body is arranged, and the other end in the predetermined direction of the holding member is fixed to the second protruding portion protruding from the second shaping surface on which the second region of the laminated body is arranged. Accordingly, it is possible to fix the holding member to the shaping die so as not to come into contact with the end face in the predetermined direction of the second region of the laminated body while maintaining a state where the laminated body is pressed against the curved portion of the shaping die.

In a preferable aspect of the shaping device of the above configuration, in the state before the enclosed space is depressurized by the depressurizing unit, the holding member may be fixed to the shaping die so as to form a clearance between an end face in the predetermined direction of the second region of the laminated body and the second protruding portion.

According to the shaping device of the present aspect, since the clearance is formed between the end face in a predetermined direction of the second region of the laminated body and the second protruding portion, it is possible to reliably prevent the holding member from coming into contact with the end face in the predetermined direction of the second region of the laminated body and interfering with the interlayer sliding between the sheet materials.

In a preferable configuration of the shaping device of the present disclosure, a plurality of holding members may be arranged at a plurality of positions spaced apart from each other in a direction orthogonal to the predetermined direction.

According to the shaping device of the present configuration, even when the shaping die has a shape having a curvature in a direction orthogonal to the predetermined direction (contour shape), it is possible to fix a plurality of holding members, which are spaced apart from each other in the direction orthogonal to the predetermined direction, to the shaping die without causing a wrinkle in the holding member.

What is claimed is:

1. A shaping method for shaping a laminated body of multi-layered sheet materials containing reinforcing fibers by using a shaping die,
   wherein the shaping die has
   a curved portion formed in a convex shape over a predetermined direction,
   a first shaping surface on which the first region of the laminated body is arranged,
   a first protruding portion protruding from the first shaping surface and arranged facing an end face in the predetermined direction of the first region of the laminated body,
   a second shaping surface on which the second region of the laminated body is arranged, and
   a second protruding portion protruding from the second shaping surface and arranged facing an end face in the predetermined direction of the second region of the laminated body,
   the shaping method comprising:
   an arrangement step of arranging a first region in the predetermined direction of the laminated body on the shaping die;
   a bending step of bending the laminated body along a surface shape of the curved portion by pressing the second region of the laminated body against the shaping die, the first region of the laminated body being arranged on the shaping die in the arrangement step,
   a fixing step of fixing, to the shaping die, a holding member configured to cover the laminated body over the predetermined direction so as to maintain a state where the laminated body is pressed against the curved portion;
   a sealing step of sealing an entire part of the laminated body and an entire part of the holding member to the shaping die by a sealing member to form an enclosed space, the sealing member being formed in a sheet-like manner; and
   a depressurizing step of depressurizing the enclosed space to thin the laminated body by sucking air of the enclosed space formed in the sealing step,
   wherein the fixing step fixes one end in the predetermined direction of the holding member to the first protruding portion and fixes the other end in the predetermined direction of the holding member to the second protruding portion such that the holding member does not come into contact with an end face in a second region of the laminated body, the second region being different from the first region in the predetermined direction,
   wherein the bending step is configured to bend the laminated body along the surface shape of the curved portion formed in a convex shape by using a shaping tool which applies tension for maintaining a stretched state of the laminated body such that the second region of the laminated body is moved to come into contact with the second shaping surface while the stretched state of the laminated body is maintained, the holding member being formed in a sheet-like manner or a tape-like manner,
   wherein the sealing step seals the whole of the laminated body and the whole of the holding member into the enclosed space by joining one end in the predetermined direction of the sealing member to the first protruding portion and joining the other end in the predetermined direction of the holding member to the second protruding portion, and
   wherein in the depressurizing step, the sealing member comes into contact with an entire part of the holding member in response to the depressurization of the enclosed space.

2. The shaping method according to claim 1, wherein the fixing step fixes the holding member to the shaping die such that a clearance is formed between an end face in the predetermined direction of the second region of the laminated body and the second protruding portion.

3. The shaping method according to claim 1, wherein the holding member is formed of a plurality of holding members, and the fixing step fixes, to the shaping die, the plurality of holding members spaced apart from each other in a direction orthogonal to the predetermined direction.

4. A shaping device configured to shape a laminated body of multi-layered sheet materials containing reinforcing fiber, the shaping device comprising:
   a shaping die having
   a curved portion formed in a convex shape over a predetermined direction,
   a first shaping surface on which a first region in the predetermined direction of the laminated body is arranged,
   a first protruding portion protruding from the first shaping surface and arranged facing an end face in the predetermined direction of the first region of the laminated body,
   a second shaping surface on which a second region in the predetermined direction of the laminated body is arranged, and
   a second protruding portion protruding from the second shaping surface and arranged facing an end face in the predetermined direction of the second region of the laminated body bent along the curved portion;
   a holding member configured to cover the laminated body over the predetermined direction so as to maintain a state where the laminated body is pressed against the curved portion;
   a sealing member configured to seal an entire part of the laminated body and an entire part of the holding member to the shaping die to form an enclosed space, the sealing member being formed in a sheet-like manner; and
   a depressurizing unit configured to depressurize the enclosed space to thin the laminated body by sucking air of the enclosed space,
   wherein one end in the predetermined direction of the holding member is fixed to the first protruding portion, and the other end in the predetermined direction of the holding member is fixed to the second protruding portion, wherein the whole of the laminated body and the whole of the holding member are sealed into the enclosed space by joining one end in the predetermined direction of the sealing member to the first protruding portion and joining the other end in the predetermined direction of the holding member to the second protruding portion, wherein in a state before the enclosed space is depressurized by the depressurizing unit, the holding member is fixed to the shaping die so as not to come into contact with an end face in a second region of the laminated body, the second region being different from the first region in the predetermined direction, and wherein the laminated body is bent along a surface shape of the curved portion formed in a convex shape by using a shaping tool which applies tension to maintain a stretched state of the laminated body such that the second region of the laminated body is moved to come into contact with the second shaping surface while the stretched state of the laminated body is maintained, the holding member being formed in a sheet-like manner or a tape-like manner, wherein the sealing member comes into contact with the holding member in response to the depressurization of the enclosed space.

5. The shaping device according to claim 4, wherein in the state before the enclosed space is depressurized by the depressurizing unit, the holding member is fixed to the shaping die so as to form a clearance between an end face in the predetermined direction of the second region of the laminated body and the second protruding portion.

6. The shaping device according to claim 4, wherein the holding member is formed of a plurality of holding members, and the plurality of holding members are arranged at a plurality of positions spaced apart from each other in a direction orthogonal to the predetermined direction.

* * * * *